US012563280B2

(12) United States Patent
Sun et al.

(10) Patent No.: US 12,563,280 B2
(45) Date of Patent: Feb. 24, 2026

(54) VEHICULAR CAMERA ASSEMBLY WITH ENHANCED LENS CLEANING

(71) Applicant: Magna Electronics Inc., Auburn Hills, MI (US)

(72) Inventors: Guang Wen Sun, Cambridge, MA (US); Antonio Antonellis Rufo, Sharon, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 200 days.

(21) Appl. No.: 18/494,999

(22) Filed: Oct. 26, 2023

(65) Prior Publication Data

US 2024/0147036 A1 May 2, 2024

Related U.S. Application Data

(60) Provisional application No. 63/381,193, filed on Oct. 27, 2022.

(51) Int. Cl.
*H04N 23/51* (2023.01)
*B60R 11/04* (2006.01)
*B60S 1/56* (2006.01)

(52) U.S. Cl.
CPC .............. *H04N 23/51* (2023.01); *B60R 11/04* (2013.01); *B60S 1/56* (2013.01)

(58) Field of Classification Search
CPC ............ H04N 23/51; B60R 11/04; B60S 1/56
USPC ........................................................ 348/148
See application file for complete search history.

(56) References Cited

U.S. PATENT DOCUMENTS

| | | | | |
|---|---|---|---|---|
| 4,653,883 | A * | 3/1987 | Maeno | G03B 17/08 |
| | | | | 396/177 |
| 5,550,677 | A | 8/1996 | Schofield et al. | |
| 5,670,935 | A | 9/1997 | Schofield et al. | |
| 5,949,331 | A | 9/1999 | Schofield et al. | |
| 6,554,210 | B2 | 4/2003 | Holt et al. | |
| 6,719,215 | B2 | 4/2004 | Drouillard | |
| 6,944,908 | B2 | 9/2005 | Hoetzer et al. | |
| 7,014,131 | B2 | 3/2006 | Berning et al. | |
| 7,267,290 | B2 | 9/2007 | Gopalan et al. | |
| 7,627,235 | B2 | 12/2009 | McCutchen et al. | |
| 8,567,963 | B1 | 10/2013 | Criscuolo et al. | |
| 8,671,504 | B2 | 3/2014 | Ono et al. | |
| 9,213,218 | B1 * | 12/2015 | Coons | G03B 17/08 |
| 9,604,601 | B2 | 3/2017 | Hsiao et al. | |
| 9,645,392 | B2 | 5/2017 | Yoshimura | |

(Continued)

*Primary Examiner* — Matthew David Kim
(74) *Attorney, Agent, or Firm* — HONIGMAN LLP

(57) ABSTRACT

A vehicular camera module includes a camera and a cover assembly including a housing having inner and outer housing portions. The inner housing portion accommodates a transparent cover. The camera views through the cover and an outer surface of the cover is exposed exterior of the vehicle. The inner housing portion and the cover are rotatable relative to the camera. A perimeter region of the cover is recessed into the inner housing portion. A plurality of drainage channels extend radially along an outer surface of the inner housing portion and are coplanar with or recessed from the perimeter region of the outer surface of the cover. A motor operates to rotate the cover relative to the outer housing portion and the camera, which sheds moisture at the outer surface of the cover so that the moisture flows from the outer surface of the cover along the drainage channels.

24 Claims, 7 Drawing Sheets

(56) References Cited

U.S. PATENT DOCUMENTS

| | | | |
|---|---|---|---|
| 9,707,896 B2 | 7/2017 | Boegel et al. | |
| 10,399,509 B2 | 9/2019 | Byrne et al. | |
| 10,589,726 B1 | 3/2020 | Ingram | |
| 10,604,121 B2 | 3/2020 | Blank | |
| 11,140,301 B2 | 10/2021 | Condron et al. | |
| 11,722,756 B2 * | 8/2023 | Ko | G03B 17/12 |
| | | | 348/373 |
| 2003/0090569 A1 | 5/2003 | Poechmueller | |
| 2004/0189831 A1 | 9/2004 | Shibatani et al. | |
| 2007/0132610 A1 | 6/2007 | Guernalec | |
| 2007/0273971 A1 | 11/2007 | Waldmann et al. | |
| 2008/0144197 A1 * | 6/2008 | Hong | G02B 7/08 |
| | | | 359/824 |
| 2008/0179482 A1 | 7/2008 | van Amelsfoort | |
| 2009/0244361 A1 | 10/2009 | Gebauer et al. | |
| 2009/0250533 A1 | 10/2009 | Akiyama et al. | |
| 2011/0073142 A1 | 3/2011 | Hattori et al. | |
| 2011/0181725 A1 | 7/2011 | Matsuura | |
| 2013/0092758 A1 | 4/2013 | Tanaka et al. | |
| 2013/0094086 A1 | 4/2013 | Bochenek | |
| 2013/0146577 A1 | 6/2013 | Haig et al. | |
| 2013/0209079 A1 | 8/2013 | Alexander et al. | |
| 2013/0255023 A1 | 10/2013 | Kikuta et al. | |
| 2013/0319486 A1 | 12/2013 | Kikuta et al. | |
| 2014/0060582 A1 | 3/2014 | Hartranft et al. | |
| 2014/0104426 A1 | 4/2014 | Boegel et al. | |
| 2014/0232869 A1 | 8/2014 | May et al. | |
| 2015/0138357 A1 | 5/2015 | Romack et al. | |
| 2015/0277111 A1 | 10/2015 | Bell et al. | |
| 2015/0344001 A1 | 12/2015 | Lopez Galera et al. | |
| 2015/0353024 A1 | 12/2015 | Cooper | |
| 2016/0103315 A1 * | 4/2016 | Weber | H04N 23/52 |
| | | | 348/148 |
| 2016/0103316 A1 | 4/2016 | Rousseau | |
| 2016/0272163 A1 | 9/2016 | Dreiocker et al. | |
| 2017/0349147 A1 * | 12/2017 | Blank | B60S 1/566 |
| 2018/0013933 A1 * | 1/2018 | Barton | B08B 6/00 |
| 2018/0207691 A1 | 7/2018 | Byrne et al. | |
| 2018/0361998 A1 | 12/2018 | Renaud | |
| 2019/0023193 A1 * | 1/2019 | Ghannam | B60R 11/04 |
| 2019/0041234 A1 | 2/2019 | Ghannam | |
| 2019/0146213 A1 * | 5/2019 | Slama | H04N 23/51 |
| | | | 359/511 |
| 2019/0299938 A1 | 10/2019 | Deegan | |
| 2020/0070778 A1 * | 3/2020 | Fan | G02B 27/0006 |
| 2020/0114877 A1 | 4/2020 | Hu | |
| 2020/0254979 A1 | 8/2020 | Bretagnol | |
| 2020/0275004 A1 * | 8/2020 | Condron | H04N 23/61 |
| 2021/0370844 A1 * | 12/2021 | Hu | B60S 1/023 |
| 2022/0038611 A1 * | 2/2022 | Meister | B60S 1/56 |
| 2022/0094831 A1 * | 3/2022 | Lang | G03B 17/08 |
| 2022/0146911 A1 * | 5/2022 | Gwalani | G03B 11/00 |
| 2022/0221713 A1 * | 7/2022 | Mackey | G02B 27/0006 |
| 2022/0263990 A1 | 8/2022 | Condron | |
| 2022/0394158 A1 * | 12/2022 | Ko | H04N 23/52 |

* cited by examiner

VEHICULAR CAMERA ASSEMBLY WITH ENHANCED LENS CLEANING

CROSS REFERENCE TO RELATED APPLICATION

The present application claims the filing benefits of U.S. provisional application Ser. No. 63/381,193, filed Oct. 27, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle utilizes one or more cameras (preferably one or more CMOS cameras) to capture image data representative of images exterior of the vehicle. The vision system or imaging system for a vehicle utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle. The camera module may, from time to time, become occluded by moisture or debris. Thus, the camera assembly is operable to rotate an outer lens element at a high enough rate to shed moisture from an outer surface of the outer lens element.

For example, a camera module for the vision system includes a camera mounted at a vehicle so as to have a field of view exterior of the vehicle. A cover assembly includes a mounting portion and an inner housing that is rotatable relative to the mounting portion. The inner housing accommodates a transparent cover element that is rotatable with the inner housing relative to the mounting portion. The mounting portion is mounted at the vehicle so that the camera views through the transparent cover element of the cover assembly. An outer surface of the transparent cover element is exposed exterior of the vehicle. A perimeter region of the outer surface of the transparent cover element is at least partially recessed from an outer surface of the inner housing. A plurality of drainage channels extend radially along the outer surface of the inner housing. The plurality of drainage channels are coplanar with or at least partially recessed from the perimeter region of the outer surface of the transparent cover element. When the electrically operated motor is electrically operated to rotate the transparent cover element, rotation of the transparent cover element sheds moisture from the outer surface of the transparent cover element so that moisture from the outer surface of the transparent cover element flows through the plurality of drainage channels and away from the transparent cover element.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
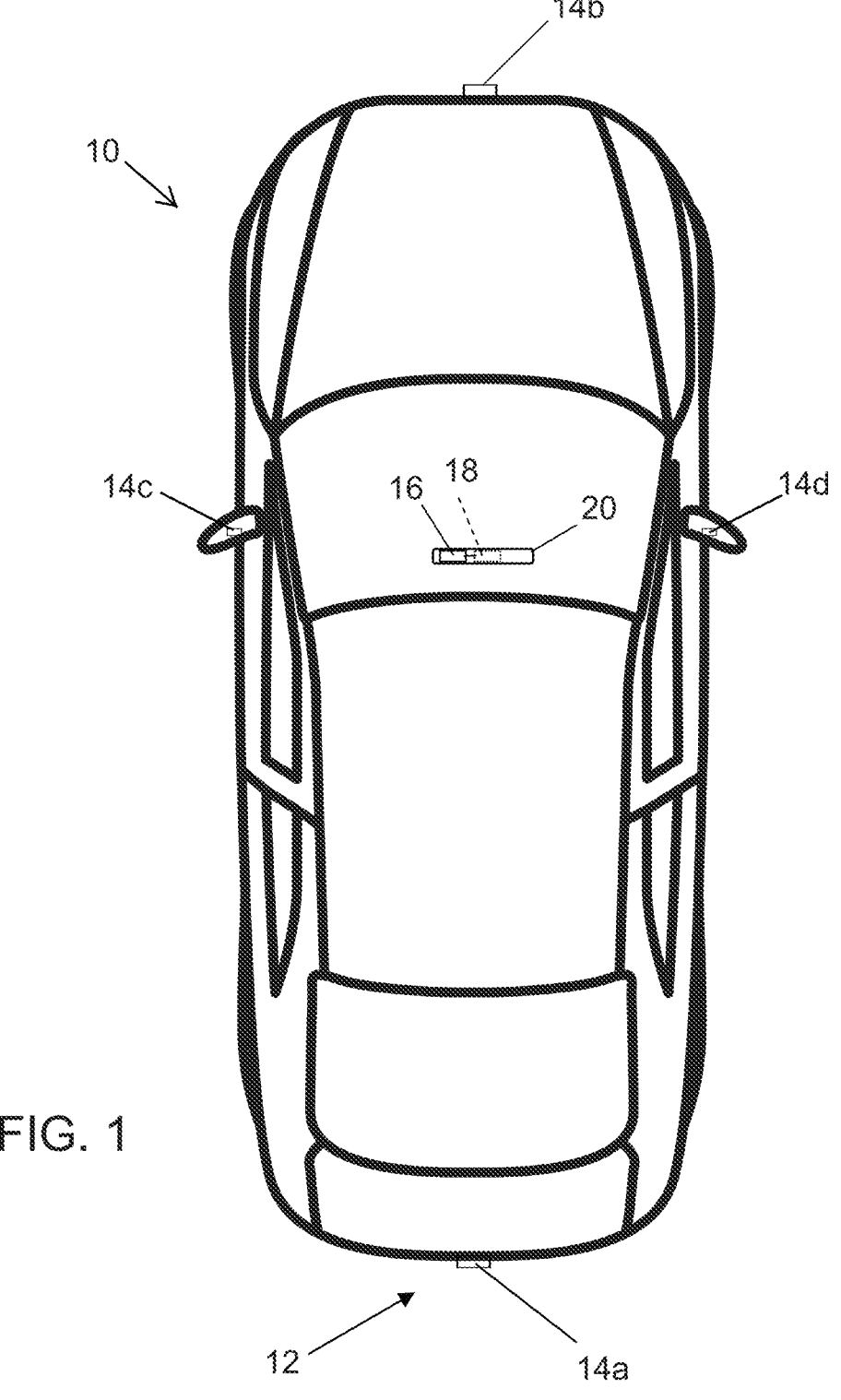
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera or rear backup camera 14a having a field of view at least rearward of the vehicle (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
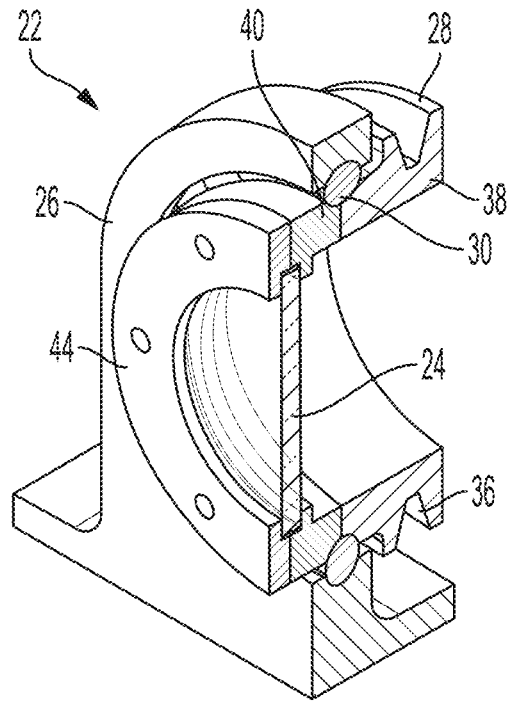
FIG. 2 is sectional view of an outer cover assembly disposed over the vehicular camera so that the camera views through the camera lens and a transparent lens of the outer cover assembly.

As shown in FIG. 2, the camera mounted at the vehicle so as to have an exterior field of view may view through a clear or transparent outer lens or cover element 24 of a lens or cover assembly 22. The cover assembly 22 is disposed at least partially around the camera and in front of the camera lens and imager. Thus, the imager views through the camera lens and outer lens 24 to capture image data representative of the view exterior of the vehicle. The outer lens 24 may be exposed exterior of the vehicle, where it may, from time to time, become occluded by dirt, debris, condensation, moisture, and/or other contaminants. When the outer lens 24 becomes occluded by contaminants, image data captured by the camera and processed to display images to the driver of the vehicle or to provide a system of the vehicle may be incomplete, unreliable, or otherwise corrupted.

To remove contaminants such as moisture from the outer lens 24, the outer lens 24 is rotatably mounted relative to the camera and rotatably driven via a motor and pulley of the cover assembly 22. The motor operates to spin the outer lens 24 at a high speed to shed water droplets from the outer lens 24. The outer lens 24 may be treated with a hydrophobic coating to further repel water from the outer lens 24. Furthermore, a cleaning system including a spraying device for washing or rinsing dry contaminants from the lens may be mounted at or near the camera assembly for dispensing water or a cleaning solution onto the lens prior to or while the cover is rotatably driven. For example, the camera assembly may utilize characteristics of the cameras and cleaning systems described in U.S. Pat. Nos. 11,140,301; 10,604,121; 10,399,509 and/or 9,707,896 and/or U.S. Publication Nos. US-2022-0263990; US-2016-0272163 and/or US-2018-0361998, which are hereby incorporated herein by reference in their entireties.

The cover assembly 22 includes an outer housing 26 that is fixedly mounted and stationary relative to the vehicle camera. The outer lens 24 is mounted at an outer end of an inner housing 28 or cylindrical glass disk retainer that is rotatably disposed within the outer housing 26 and rotatable relative to the outer housing 26. For example, one or more bearings, such as a roller bearing or ball bearing 30, is disposed or formed between an outer surface of the inner housing 28 and an inner surface of the outer housing 26. For example, the outer lens 24 may be press-fit between or within individual rings that are stacked together to form the inner housing 28 such that the inner housing 28 comprises a cylindrical housing disposed within a cylindrical chamber or channel of the outer housing 26. In the illustrated example, the inner housing 28 includes at least an inner ring 38 rotatably driven by an electrically operable motor 32 (FIG. 6), an intermediate ring 40 that retains ball members of the bearing 30 to allow the inner housing 28 to rotate relative to the outer housing 26, and an outer ring 44 that retains the outer lens 24 between the outer ring 44 and the intermediate ring 40.

Figure 6:
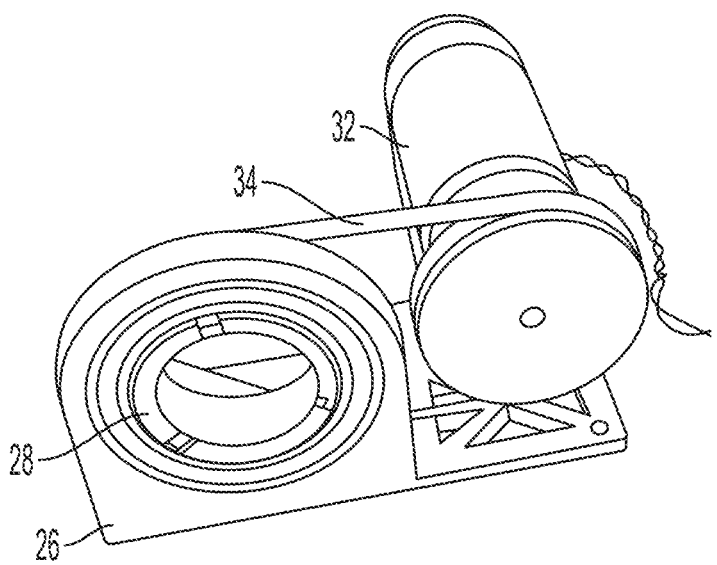
FIGS. 6 and 7 are perspective views of the outer cover assembly and an electric motor that is electrically operable to rotate an inner housing of the outer cover assembly relative to an outer housing of the outer cover assembly.
Figure 7:
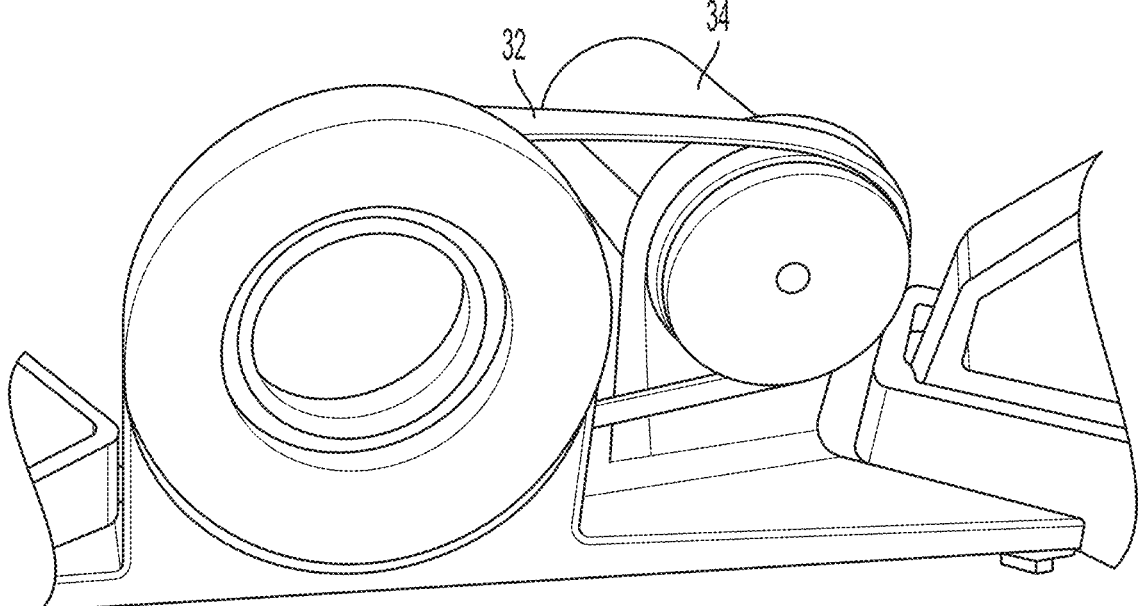

The inner housing 28 is rotatably driven by the electrically operable motor 32 of the cover assembly 22 to spin the outer lens 24. As shown in FIGS. 2, 6, and 7, the inner housing 28 includes a channel or groove or attachment feature 36 at the inner end or region or inner ring 38 of the inner housing 28 that is configured to receive a belt or drive element 34 driven by the motor 32. For example, the channel 36 may be configured to receive a V-belt drive element 34. Thus, when the motor 32 is electrically operated, the motor 32 drives the belt 34 to rotate or spin the inner housing 28 and outer lens 24 relative to the outer housing 26 and camera. In some examples, the attachment feature 36 at the inner ring 38 includes teeth that engage the drive element 34 (which, in these examples, may include a chain or gear element) so that the motor 32 imparts movement of the inner housing 28 by driving the drive element 34. Optionally, the belt, inner housing, and outer housing may comprise a thermoplastic or rubber material, or may be 3D printed from such material.

Figure 3:
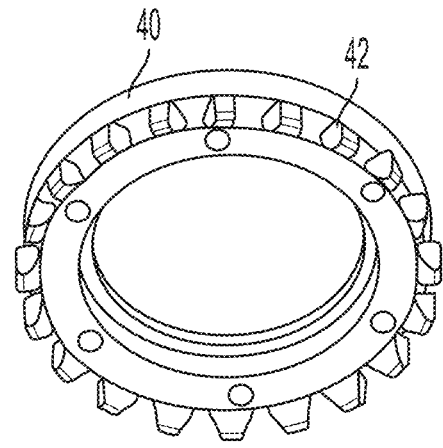
FIG. 3 is a perspective view of an inner ring of the outer cover assembly.

As shown in FIGS. 2 and 3, the intermediate ring 40 may include bearing ball retainer features 42 disposed about the intermediate ring 40 and the outer housing 26 may include a channel or groove so that bearing ball members of the ball bearing 30 are retained between the retainer features 42 of the intermediate ring 40 and the channel of the outer housing 26. Thus, the intermediate ring 40 retains the bearing balls and a ball bearing raceway is formed for reducing friction between the inner housing 28 and the outer housing 26 to reduce noise and increase maximum rotational speed when the inner housing 28 and the outer lens 24 are rotated to shed water from the outer lens 24.

Figure 4:
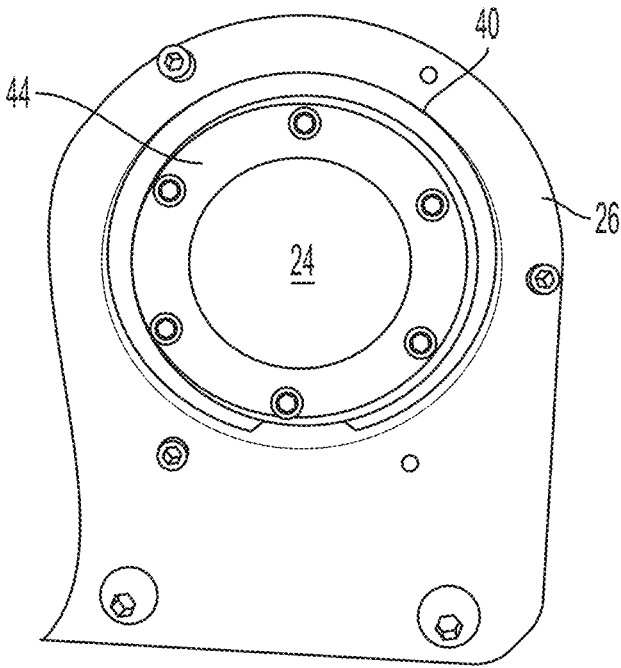
FIG. 4 is a perspective view of the outer cover assembly.

As shown in FIG. 4, the intermediate ring 40 of the cover assembly 22 includes a rubber bearing. The inner ring 38 and the outer ring 44 clamp onto the intermediate ring 40. In other words, the intermediate ring 40 may comprise an at least partially compressible material, so that with the inner ring 38 and the outer ring 44 joined together, the intermediate ring 40 is at least partially compressed between the inner ring 38 and the outer ring 44. For example, one or more threaded fasteners may extend from the outer ring 44 and through the intermediate ring 44 to the inner ring 38, where the threaded fasteners threadably engage the inner ring 38 and/or one or more threaded elements (e.g., a threaded nut) at the inner ring 38 for joining the rings of the inner housing 28 together. The outer lens 24 may be disposed between respective flanges of the outer ring 44 and the intermediate ring 40 so that the outer ring 44 and intermediate ring 40 seal against opposing sides of the outer lens 24. The inner ring 38 is configured to mount a camera inside, such as a 2.3 megapixel camera, or a camera of any suitable size, such as a camera commercially available from Leopard Imaging, Inc. of Fremont, California.

Figure 5:
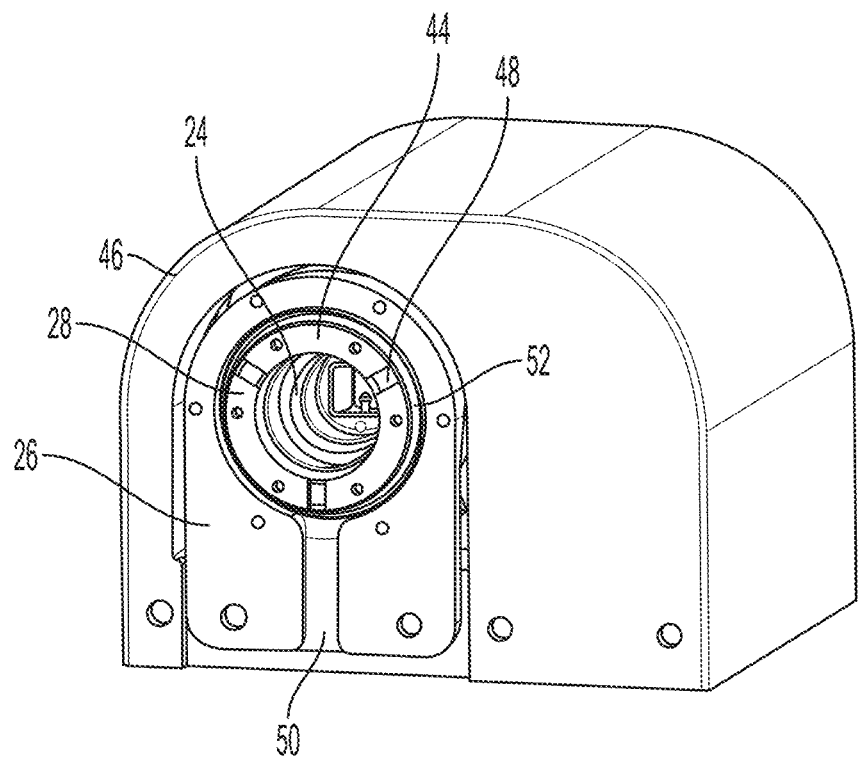
FIG. 5 is a perspective view of the outer cover assembly disposed in a waterproof housing.

As shown in FIG. 5, a waterproof housing 46 may be disposed over and accommodate or house the outer housing 26, such as for weather testing or for mounting at the vehicle. Furthermore, drainage features or channels or grooves 48 are formed in the front face of the outer ring 44 so that, as the inner housing 28 spins, centrifugal force forces the moisture to the outer edge or perimeter region of the outer lens 24 and off of the outer lens 24 through the drainage channels 48. In the illustrated example, the drainage channels 48 each extend from an inner edge of the outer ring 44 at the outer lens 24 and radially outward from the outer lens 24 to an outer edge of the outer ring 44. The drainage channels 48 are recessed from the outer surface of the outer ring 44 at a plurality of positions radially about the outer ring 44. The front or outer facing surface of the outer lens 24 is recessed from the front surface of the outer ring 44 and the drainage channels 48 are coplanar with (or recessed from) the front surface of the outer lens 24 to allow water to flow from the front surface of the outer lens 24 and away from the inner housing 28 through the drainage channels 48 as the outer lens is rotated.

Put another way, the outer ring 44 of the inner housing 28 includes a lip or raised portion at least partially circumscribing the outer lens 24 and raised or offset relative to the outer surface of the outer lens 24, with respective drainage channels 48 formed in the lip of the outer ring 44 and coplanar with or slightly recessed from the outer surface of the outer lens 24 so that moisture forced to the edges of the outer lens 24 via centrifugal forces may be guided along the lip of the outer ring 44 and to the drainage channels 48 as the inner housing 28 spins. Optionally, the outer lens 24 may have a convex shape or profile to promote movement of moisture away from the center of the lens 24 and toward the perimeter edge region and the drainage channels 48. Thus, the drainage channels 48 improve moisture removal from the inner housing 28.

A drainage groove 50 may be formed in the front or outer facing surface of the outer housing 26 and extend downward away from the inner housing 28 to allow moisture to flow or drain from the inner housing drainage channels 48 and away from the cover assembly 22. A circular or cylindrical space or gap 52 between the inner housing 28 and the outer housing 26 that is fluidly connected to the drainage groove 50 may allow water released from the outer lens 24 to collect in the gap 52 and funnel to the drainage groove 50 at a lowest point of the gap 52. In other words, as the moisture drains away from the outer lens 24 through the drainage channels 48, the moisture may collect in the cylindrical gap 52 between the inner housing 28 and the outer housing 26. From there, gravitational forces cause the moisture to flow along the gap 52 toward the drainage groove 50 that extends from the gap 52 and downward along the front surface of the outer housing 26 away from the inner housing 28. The drainage groove 50 directs the flow of expelled moisture away from the cover lens assembly 22 and exterior the vehicle.

The belt or drive element 34 may be driven by any suitable electrically operable motor, such as a brushless or brushed direct current (DC) motor that operates using a 7 volt or 12 volt power supply (FIGS. 6 and 7). The electric motor 32 may be operable to spin the inner housing 28 at a suitable rate to create centrifugal forces at the outer lens 24 and cause water droplets to shed or run off the outer lens 24. For example, the inner housing 28 and lens may spin at 1,000 revolutions per minute (RPM), 1,500 RPM, 3,000 RPM, 4,000 RPM or more at a sustained motor RPM. The motor 32 connects to the inner housing 28 via the drive element 34 and may have any suitable pulley ratio, such as 1.5 to 1, to accommodate for the torque of the motor. For example, the motor 32 may drive a gear element, with the belt attached to the gear element at the motor 32 and received along the groove 36 of the inner ring 38, or the gear element at the motor may directly engage the inner ring 38 for imparting movement of the inner housing 28. The input diameter at the motor may be smaller than the output diameter at the inner housing 28 to reduce the torque experienced at the housing. Noise and torque reduction may be achieved through use of a rope belt, plastic pulley, and smaller bearings.

Figure 8A:
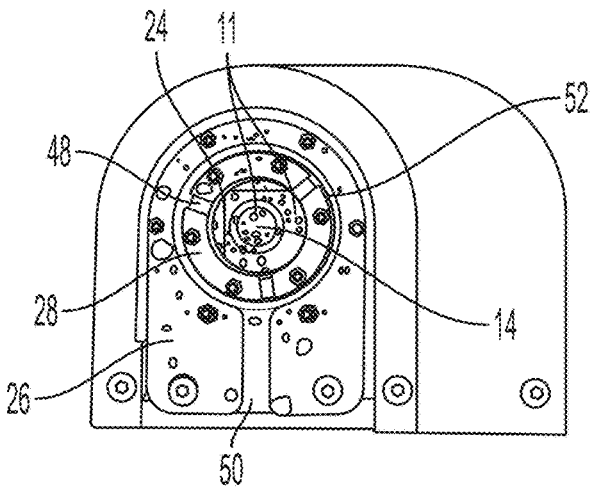
FIG. 8A is a perspective view of the outer cover assembly with water droplets at least partially occluding the view of the camera through the transparent lens of the outer cover assembly.
Figure 8B:
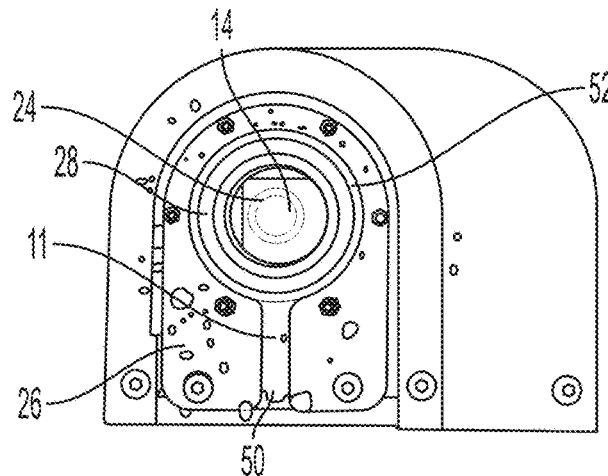
FIG. 8B is a perspective view of the outer cover assembly, showing the inner housing rotating relative to the outer housing to shed the water droplets from the transparent lens.
Figure 8C:
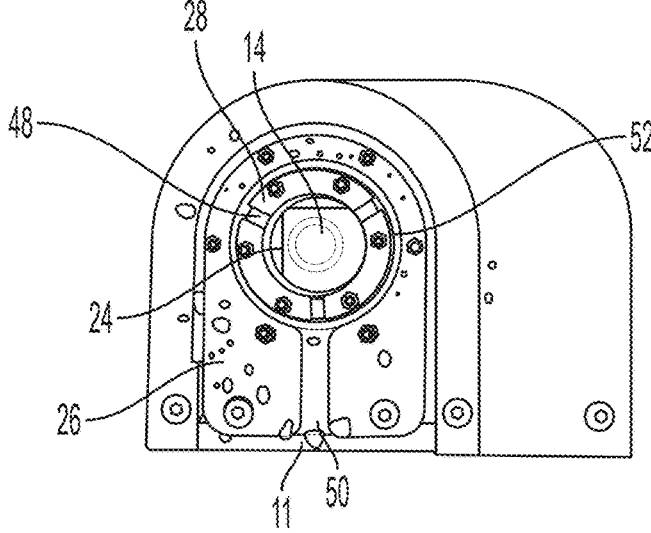
FIG. 8C is a perspective view of the outer cover assembly after the inner housing has been rotated relative to the outer housing, showing the water droplets removed or reduced at the transparent lens of the outer cover assembly.

FIG. 8A depicts the cover assembly 22 with water droplets 11 disposed at the transparent cover 24 and at least partially obscuring or occluding the view of the camera 14 through the transparent cover 24 and the inner housing 28 and outer lens 24 stationary relative to the outer housing 26 and the vehicle. FIG. 8B depicts the inner housing 28 spinning or rotating relative to the outer housing 26 to shed or remove the water droplets 11 from the transparent cover 24. As shown, the water droplets 11 may flow from the outer surface of the transparent cover 24 and through or along the drainage grooves 48 formed in the front face of the inner housing 28 and the drainage groove of the outer housing 26 and away from the cover assembly 22. FIG. 8C depicts the cover assembly 22 after the inner housing 28 has been rotated, showing that water droplets 11 have been removed or reduced from the transparent cover 24, providing a more clear view for the camera 14 viewing through the transparent cover 24.

Thus, the rotating lens or cover 22, which may be treated with a hydrophobic coating, is positioned in front of a camera or other optical sensor to shed water droplets that would otherwise impede the vision quality of the sensor. The rotating lens is driven via a motor and may be driven via a dedicated motor or a shared motor, such as part of a centralized sensor cleaning system or shared with another existing vehicle system. The lens is driven by a belt or pulley coupled to the motor, such as a rope belt to minimize noise and the torque required to spin the lens. Optionally, the lens is driven by a gear train or gear assembly, and/or directly by the motor. The lens is mounted within rings and spins within a stationary housing via ball bearings. The lens is press-fit mounted to minimize size, weight, part count, and complexity of the assembly. Additionally, features on the mounting rings and housing allow shedding water to drain away from the lens. The lens is sealed to prevent internal condensation, and water ingress, via gaskets. Furthermore, there may be single or multiple cameras or sensors behind one lens.

Optionally, a controller or the ECU may determine when to activate the motor to spin the lens assembly. For example, the ECU may determine that quality of image data captured by the camera is reduced, such as due to the lens being occluded by contaminants or condensation and, in response to determination that the image data quality is reduced, operate the motor to spin the cover and shed condensation. Furthermore, the ECU may selectively operate the motor to spin the lens for an energy savings function, such as based on weather forecasts, temperature and dew point data, or the initial diagnostic procedure with camera image and vision algorithm (e.g., droplet detection).

In other words, the system may operate the motor to spin the inner housing and lens based on determination of a vehicle condition or environmental condition. For example, the system may spin the inner housing and lens responsive to determination of rain or snow or icy weather conditions, or responsive to determination that the vehicle is travelling along a dirt road or a wet road. Because airflow across the lens during vehicle motion may at least partially remove moisture and contaminants from the outer lens, the system may only operate the motor to spin the inner housing and lens when the vehicle is travelling below a threshold speed (such as less than 5 miles per hour, less than 10 miles per hour, less than 25 miles per hour and the like) or when the vehicle is performing a parking maneuver. Optionally, the system may operate the motor to spin the inner housing and lens and thus shed water from the lens in response to a user input, such as upon vehicle startup or responsive to the user activating a windshield wiper spray nozzle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera module, the vehicular camera module comprising:

a camera disposed at a vehicle equipped with the vehicular camera module, wherein the camera has a field of view exterior of the vehicle;

a cover assembly comprising a housing having an inner housing portion and an outer housing portion;

wherein the inner housing portion accommodates a transparent cover element;

wherein the outer housing portion is configured to mount the cover assembly at the vehicle so that the camera views through the transparent cover element, and wherein the inner housing portion and the transparent cover element are rotatable relative to the outer housing portion and relative to the camera;

wherein an outer surface of the transparent cover element is exposed exterior of the vehicle;

wherein a perimeter region of the outer surface of the transparent cover element is at least partially recessed into the inner housing portion, and wherein a plurality of drainage channels extend radially along an outer surface of the inner housing portion adjacent to the perimeter region of the outer surface of the transparent cover element, and wherein the plurality of drainage channels are one selected from the group consisting of (i) coplanar with the perimeter region of the outer surface of the transparent cover element and (ii) at least partially recessed from the perimeter region of the outer surface of the transparent cover element;

wherein the inner housing portion is rotatably disposed within a cylindrical channel of the outer housing portion, and wherein the outer housing portion comprises a drainage groove that extends radially away from the inner housing portion and the transparent cover element, and wherein the drainage groove is in fluid communication with the cylindrical channel of the outer housing portion;

an electrically operable motor that, when electrically operated, rotates the transparent cover element relative to the outer housing portion and relative to the camera; and wherein, when the electrically operated motor is electrically operated, rotation of the transparent cover element sheds moisture at the outer surface of the transparent cover element so that moisture flows from the outer surface of the transparent cover element along the plurality of drainage channels of the inner housing portion and away from the transparent cover element, into the cylindrical channel of the outer housing portion and along the drainage groove of the outer housing portion away from the vehicular camera module.

2. The vehicular camera module of claim 1, wherein, when the electrically operated motor is electrically operated, the electrically operated motor rotates the inner housing portion relative to the outer housing portion to rotate the transparent cover element relative to the camera.

3. The vehicular camera module of claim 2, wherein the electrically operated motor is disposed remote from the inner housing portion, and wherein, when the electrically operated motor is electrically operated, the electrically operated motor drives a belt coupled to the electrically operated motor and the inner housing portion.

4. The vehicular camera module of claim 3, wherein an annular groove is formed along an outer peripheral surface of the inner housing portion, and wherein the belt is received along the annular groove.

5. The vehicular camera module of claim 1, wherein the inner housing portion comprises an inner ring and an outer ring, and wherein the transparent cover element is secured between the inner ring and the outer ring.

6. The vehicular camera module of claim 5, wherein the inner housing portion further comprises an intermediate ring between the inner ring and the outer ring, and wherein the intermediate ring is at least partially compressed between the inner ring and the outer ring to seal against the transparent cover element.

7. The vehicular camera module of claim 1, wherein the plurality of drainage channels are coplanar with the perimeter region of the outer surface of the transparent cover element.

8. The vehicular camera module of claim 1, wherein the plurality of drainage channels are at least partially recessed from the perimeter region of the outer surface of the transparent cover element.

9. The vehicular camera module of claim 1, wherein a hydrophobic coating is disposed at the outer surface of the transparent cover element.

10. The vehicular camera module of claim 1, wherein the housing comprises a waterproof housing.

11. The vehicular camera module of claim 1, wherein, when the electrically operated motor is electrically operated, the transparent cover element rotates relative to the camera at a rate that is greater than 1,000 revolutions per minute (RPM).

12. The vehicular camera module of claim 1, wherein, when the electrically operated motor is electrically operated, the transparent cover element rotates relative to the camera at a rate that is greater than 3,000 revolutions per minute (RPM).

13. The vehicular camera module of claim 1, wherein, when the electrically operated motor is electrically operated, the transparent cover element rotates relative to the camera at a rate that is greater than 4,000 revolutions per minute (RPM).

14. The vehicular camera module of claim 1, wherein the camera comprises a rear backup camera.

15. A vehicular camera module, the vehicular camera module comprising:

a camera disposed at a vehicle equipped with the vehicular camera module, wherein the camera has a field of view exterior of the vehicle;

a cover assembly comprising a housing having an inner housing portion and an outer housing portion, wherein the inner housing portion is rotatably disposed within a cylindrical channel of the outer housing portion;

wherein the inner housing portion accommodates a transparent cover element;

wherein the outer housing portion is configured to mount the cover assembly at the vehicle so that the camera views through the transparent cover element, and wherein the inner housing portion and the transparent cover element are rotatable relative to the outer housing portion and relative to the camera;

wherein an outer surface of the transparent cover element is exposed exterior of the vehicle;

wherein a perimeter region of the outer surface of the transparent cover element is at least partially recessed into the inner housing portion, and wherein a plurality of drainage channels extend radially along an outer surface of the inner housing portion adjacent to the perimeter region of the outer surface of the transparent cover element, and wherein the plurality of drainage channels are one selected from the group consisting of (i) coplanar with the perimeter region of the outer surface of the transparent cover element and (ii) at least partially recessed from the perimeter region of the outer surface of the transparent cover element;

wherein the outer housing portion comprises a drainage groove that extends radially away from the inner housing portion and the transparent cover element, and wherein the drainage groove is in fluid communication with the cylindrical channel of the outer housing portion;

an electrically operable motor that, when electrically operated, rotates the inner housing portion relative to the outer housing portion to rotate the transparent cover element relative to the outer housing portion and relative to the camera;

wherein, when the electrically operated motor is electrically operated, the inner housing portion and the transparent cover element rotate relative to the camera at a rate that is greater than 1,000 revolutions per minute (RPM); and wherein, when the electrically operated motor is electrically operated, rotation of the transparent cover element sheds moisture at the outer surface of the transparent cover element so that moisture flows from the outer surface of the transparent cover element along the plurality of drainage channels of the inner housing portion and away from the transparent cover element, into the cylindrical channel of the outer housing portion and along the drainage groove of the outer housing portion away from the vehicular camera module.

16. The vehicular camera module of claim 15, wherein the electrically operated motor is disposed remote from the inner housing portion, and wherein, when the electrically operated motor is electrically operated, the electrically operated motor drives a belt coupled to the electrically operated motor and the inner housing portion.

17. The vehicular camera module of claim 16, wherein an annular groove is formed along an outer peripheral surface of the inner housing portion, and wherein the belt is received along the annular groove.

18. The vehicular camera module of claim 15, wherein the inner housing portion comprises an inner ring and an outer ring, and wherein the transparent cover element is secured between the inner ring and the outer ring.

19. The vehicular camera module of claim 18, wherein the inner housing portion further comprises an intermediate ring between the inner ring and the outer ring, and wherein the intermediate ring is at least partially compressed between the inner ring and the outer ring to seal against the transparent cover element.

20. The vehicular camera module of claim 15, wherein the camera comprises a rear backup camera.

21. A vehicular camera module, the vehicular camera module comprising:

a camera disposed at a vehicle equipped with the vehicular camera module, wherein the camera comprises a rear backup camera having a field of view at least rearward of the vehicle;

a cover assembly comprising a housing having an inner housing portion and an outer housing portion;

wherein the inner housing portion accommodates a transparent cover element;

wherein the outer housing portion is configured to mount the cover assembly at the vehicle so that the camera views through the transparent cover element, and wherein the inner housing portion and the transparent cover element are rotatable relative to the outer housing portion and relative to the camera;

wherein an outer surface of the transparent cover element is exposed exterior of the vehicle, and wherein a hydrophobic coating is disposed at the outer surface of the transparent cover element;

wherein a perimeter region of the outer surface of the transparent cover element is at least partially recessed into the inner housing portion, and wherein a plurality of drainage channels extend radially along an outer surface of the inner housing portion adjacent to the perimeter region of the outer surface of the transparent cover element, and wherein the plurality of drainage channels are one selected from the group consisting of (i) coplanar with the perimeter region of the outer surface of the transparent cover element and (ii) at least partially recessed from the perimeter region of the outer surface of the transparent cover element;

wherein the inner housing portion is rotatably disposed within a cylindrical channel of the outer housing portion, and wherein the outer housing portion comprises a drainage groove that extends radially away from the inner housing portion and the transparent cover element, and wherein the drainage groove is in fluid communication with the cylindrical channel of the outer housing portion;

an electrically operable motor that, when electrically operated, rotates the transparent cover element relative to the outer housing portion and relative to the camera;

wherein, when the electrically operated motor is electrically operated, the transparent cover element rotates relative to the camera at a rate that is greater than 1,000 revolutions per minute (RPM); and wherein, when the electrically operated motor is electrically operated, rotation of the transparent cover element sheds moisture at the outer surface of the transparent cover element so that moisture flows from the outer surface of the transparent cover element along the plurality of drainage channels of the inner housing portion and away from the transparent cover element, into the cylindrical channel of the outer housing portion and along the drainage groove of the outer housing portion away from the vehicular camera module.

22. The vehicular camera module of claim 21, wherein, when the electrically operated motor is electrically operated, the electrically operated motor rotates the inner housing portion relative to the outer housing portion to rotate the transparent cover element relative to the camera.

23. The vehicular camera module of claim 21, wherein the inner housing portion comprises an inner ring and an outer ring, and wherein the transparent cover element is secured between the inner ring and the outer ring.

24. The vehicular camera module of claim 23, wherein the inner housing portion further comprises an intermediate ring between the inner ring and the outer ring, and wherein the intermediate ring is at least partially compressed between the inner ring and the outer ring to seal against the transparent cover element.

* * * * *